US011983923B1

(12) United States Patent
Wang et al.

(10) Patent No.: US 11,983,923 B1
(45) Date of Patent: May 14, 2024

(54) SYSTEMS AND METHODS FOR ACTIVE SPEAKER DETECTION (71) Applicant: NETFLIX, INC., Los Gatos, CA (US)

(72) Inventors: Yadong Wang, Los Gatos, CA (US); Kyle Tacke, Los Gatos, CA (US); Shilpa Jois Rao, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 18/063,107

(22) Filed: Dec. 8, 2022

(51) Int. Cl.
G06V 20/40 (2022.01)
G10L 25/57 (2013.01)
G10L 25/60 (2013.01)
G11B 27/031 (2006.01)

(52) U.S. Cl.
CPC ............... *G06V 20/41* (2022.01); *G06V 20/48* (2022.01); *G10L 25/57* (2013.01); *G10L 25/60* (2013.01); *G11B 27/031* (2013.01); *G06V 2201/10* (2022.01)

(58) Field of Classification Search
CPC ........ G06V 20/41; G06V 20/40; G10L 25/57; G10L 25/60; G11B 27/031
See application file for complete search history.

(56) References Cited

U.S. PATENT DOCUMENTS

| 2021/0303866 | A1* | 9/2021 | Chen | G06V 10/82 |
| 2021/0319321 | A1* | 10/2021 | Krishnamurthy | G06N 20/00 |
| 2022/0165171 | A1* | 5/2022 | Xu | G06V 10/454 |
| 2023/0066499 | A1* | 3/2023 | Zhang | G10L 25/27 |
| 2023/0352029 | A1* | 11/2023 | Zhang | G10L 21/0208 |

* cited by examiner

*Primary Examiner* — Mishawn N. Hunter
(74) *Attorney, Agent, or Firm* — Greenberg Traurig, LLP (57) ABSTRACT The disclosed computer-implemented method may include receiving, as input, an audio/video data object; isolating a video stream of a visible potential speaker over a plurality of frames of the audio/video data object; isolating an audio stream over the plurality of frames; providing the isolated video stream and the isolated audio stream to a machine learning model trained with contrastive learning, the contrastive learning using (i) a corpus of video segments of visible speakers with corresponding original audio for positive samples; and (ii) a corpus of video segments of visible speakers with corresponding dubbed audio for negative samples; and evaluating a match between the isolated audio stream and the isolated video stream based at least in part on an output of the machine learning model. Various other methods, systems, and computer-readable media are also disclosed.

20 Claims, 9 Drawing Sheets

SYSTEMS AND METHODS FOR ACTIVE SPEAKER DETECTION

BACKGROUND

Many people today across the world watch media with dubbed audio. Quality dubbing can be important for an immersive and enjoyable viewing experience. For instance, when dubbed audio in a video appears to match the visuals of a speaker, a viewer watching the video may be more engaged with the content of the video and less distracted by apparent mismatches between the dubbed audio and the video.

Although quality dubbing can be valuable, dubbing (and the evaluation of dubbing) can be a time- and labor-intensive process that may involve repeated inspections of video frames and corresponding audio. It may be impractical to perfect dubbing in a video (especially across many languages) without incurring extraordinary expense when using traditional, manual techniques for performing and evaluating dubbing. Thus, additional and improved systems and methods for performing and evaluating dubbing are needed.

SUMMARY

As will be described in greater detail below, the present disclosure describes systems and methods for active speaker detection in videos. To identify an active speaker within a shot (e.g., a person who is seen and heard speaking in a shot), a machine learning model may be applied to video features of a visible person in the shot and audio features of the shot to determine how closely the video features and the audio features match. First, a video isolation process may isolate a video stream of a visible potential speaker (e.g., a visible face) over several frames of a video. In addition, an audio isolation process may isolate an audio stream over the same frames.

The isolated video stream and the isolated audio stream may be provided (e.g., in the form of extracted features) to a machine learning model trained with contrastive learning. The contrastive learning process may use original video paired with original audio for positive samples and original video paired with dubbed audio for negative samples. The output of the machine learning model may be used to evaluate how closely the isolated video stream and the isolated audio stream match.

In some cases, the above-described process may be applied to multiple different potential active speakers in a scene. Thus, isolated video of each visible face in a scene may be provided as input along with the audio for the scene to evaluate the pairing of each potential speaker with the audio (e.g., where a highest score for the machine learning model from among all the pairings based on the different visible faces is used to determine which of the visible faces is the active speaker). One or more workflows may be executed (and/or one or more reports generated) based on identifying the active speaker.

In some cases, the above-described process may be applied to dubbed audio. In these cases, a score from the machine learning model indicating how well a video stream of a visible potential speaker and the dubbed audio match may indicate the quality of the dubbing (e.g., in terms of timing, lip movements, etc.). One or more workflows may be executed (and/or one or more reports generated) based on determining the quality of the dubbing.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to active speaker detection in videos. In particular, systems described herein may apply contrastive learning techniques to generate a machine learning model capable of evaluating how well video of a speaker and corresponding audio match. Systems of the present disclosure can then apply the machine learning model to identify active speakers in a video by identifying the best matches between a potential speaker (e.g., a visible face) and speech audio. These systems can generate timestamps to designate portions of the video for dubbing.

In addition, the systems described herein can apply the machine learning model to evaluate dubbed audio. For example, by applying the machine learning model to a portion of video (e.g., isolating the face of the speaker) with dubbed audio, these systems can determine how closely the dubbed audio appears to match the visuals of the speaker. These systems can then generate workflows and/or reports based on how well or poorly the dubbed audio and the visuals match.

By automatically identifying active speakers in video segments (including, e.g., start and end times of speech to be dubbed), systems described herein may reduce labor involved in dubbing tasks. Furthermore, these systems may aggregate information about active speakers (including, e.g., how much screen time various speakers have, user engagement with videos as it relates to active speakers, etc.) to generate metadata about videos, collections of videos, and/or people, characters, and/or actors who appear in videos.

In addition, by evaluating a match between dubbed audio and the visual of the speaker, these systems may improve the dubbing process. For example, these systems may provide notifications about instances of poorly matching dubbed audio (and, in some examples, generate a workflow to redo dubbing).

Thus, systems described herein may improve the functioning of a computer by improving the dubbing, video editing, and metadata generating capabilities of the computer by accurately identifying active speakers in a video and/or estimating the quality of dubbed audio as it relates to visible active speakers. The systems and methods described herein may also represent an improvement to the field of dubbing by improving the efficiency and accuracy of dubbing.

The various embodiments mentioned above and additional embodiments will be described in greater detail below with regard to computer system 100 of FIG. 1, computer-implemented method 200 of FIG. 2, and the embodiments depicted in FIGS. 3-9.

Figure 1:
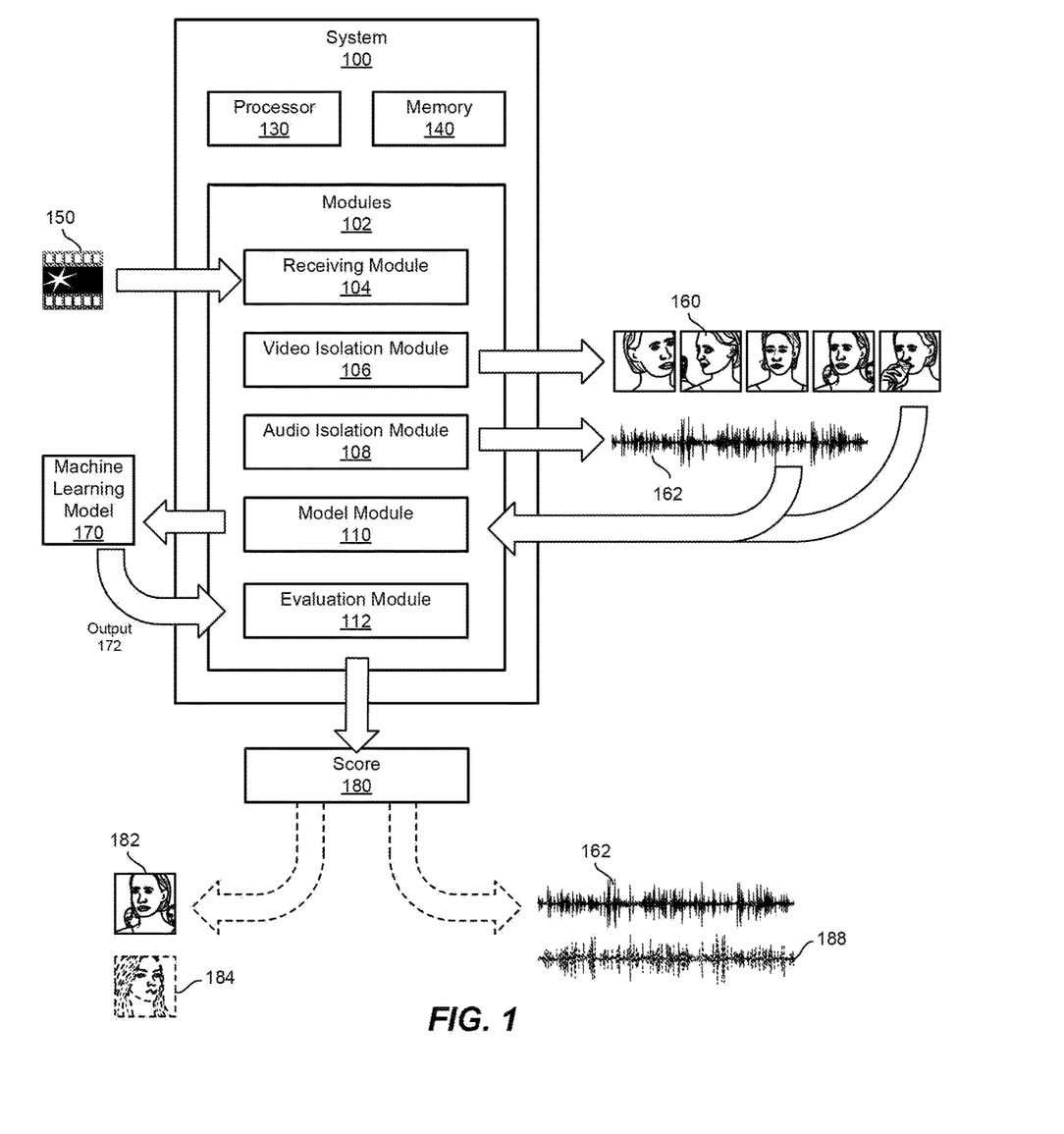
FIG. 1 is a block diagram of an example system for active speaker detection.

FIG. 1 illustrates a computer system 100. The computer system 100 includes software modules, embedded hardware components such as processors, or a combination of hardware and software. The computer system 100 is substantially any type of computing system including a local computing system or a distributed (e.g., cloud) computing system. In some cases, the computer system 100 includes at least one processor 130 and at least some system memory 140. The computer system 100 includes program modules 102 for performing a variety of different functions. The program modules are hardware-based, software-based, or include a combination of hardware and software. Each program module uses computing hardware and/or software to perform specified functions, including those described herein below.

Computer system 100 may include a receiving module 104 that is configured to receive an audio/video object 150 as input. As used herein, the term "audio/video object" may refer to any digitally stored, represented, and/or encoded data object that includes an audio component and a video component. An audio/video object may take any of a number of digitally represented forms including, without limitation, a file, a stream, a binary large object, a set of one or more of the foregoing, etc.

As will be explained in greater detail below, audio/video object 150 may include any suitable content representing any of a variety of stages of pre-processing. In some examples, audio/video object 150 may include a complete video (e.g., film, a serial episode, etc.), potentially with multiple scenes and/or multiple shots. In some examples, audio/video object 150 may include a single scene and/or a single shot. As used herein, the term "shot" may refer to any segment of video with an uninterrupted and/or continuous perspective (e.g., uninterrupted and continuous in terms of camera perspective and/or in terms of time passing). In some examples, a shot may include any segment of video over which an object tracking process is applicable (e.g, face tracking). Thus, even if a video sequence includes transient edits and/or cuts, it may still be understood as a "shot" herein if there is a potential visible active speaker to be tracked over the length of the sequence.

Computer system 100 may also include a video isolation module 106 that isolates a video stream 160 of a visible potential speaker over a plurality of frames of the audio/video data object 150. As used herein, the term "video stream" may refer to any data that represents a sequence of images. As used herein, the term "visible potential speaker" may refer to any subject shown within a video segment that is a candidate for the source of speech within the video segment. Thus, for example, the visible potential speaker may be a person and/or an anthropomorphic character. In some examples, a visible potential speaker may only be partly visible (e.g., only the head). In some examples, certain aspects of a visible potential speaker that relate to visual signs of speech may be visible (e.g., a face, lips, etc.).

As used herein, the term "isolating" as it relates to a visual subject in a video segment may refer to any of a number of operations. For example, isolating a visible potential speaker may include cropping the visible potential speaker (and/or, e.g., the face or head of the visible potential speaker) in each frame from the rest of the frame. Additionally or alternatively, isolating the visible potential speaker may include extracting the visible potential speaker (and/or, e.g., the face or head of the visible potential speaker) from the background.

Computer system 100 may also include an audio isolation module 108 that isolates an audio stream 162 over the plurality of frames. As used herein, the term "audio stream" may refer to any data that represents audio.

Computer system 100 may also include a model module 110 that provides the isolated video stream 160 and the isolated audio stream 162 to a machine learning model 170 trained with contrastive learning. As used herein, the term "contrastive learning" may refer to any machine learning technique that tends to minimize the distance between positive pairs and maximize the distance between negative pairs. As will be explained in greater detail below, machine learning model 170 may be trained with a corpus of video segments of visible speakers with corresponding original audio for positive samples and a corpus of video segments of visible speakers with corresponding dubbed audio for negative samples.

Computer system 100 may also include an evaluation module 112 that evaluates a match (e.g., producing a score 180) between the isolated audio stream 162 and the isolated video stream 160 based at least in part on an output 172 of machine learning model 170. Thus, for example, score 180 may indicate how closely isolated audio stream 162 and isolated video stream 160 match (e.g., how closely face and lip movements of isolated video stream 160 match speech in audio stream 162).

One or more systems, including, e.g., computer system 100, may perform one or more operations based on score 180. In some examples, computer system 100 may determine which of multiple potential speakers in a segment is the actual active speaker in the segment. Thus, in one example, these systems may determine that a person 182 is the active speaker (instead of, e.g., a person 184, whose corresponding isolated video resulted in a lower score than score 180 when matched with isolated audio 162 and processed by machine learning model 170). Having determined the active speaker, one or more systems described herein may augment audio/video data object 150 with metadata identifying person 182, may create a dubbing task with beginning and ending timestamps marking out the dialog from the active speaker, and/or perform one or more additional workflows.

In some examples, computer system 100 may determine the quality of isolated audio stream 162 as a dub for isolated video stream 160 (e.g., based on score 180). In addition, in some examples, computer system 100 may compare the quality of isolated audio stream 162 with one or more alternative audio streams 188 (e.g., alternative dubbing takes in the same language, dubbed audio of the same speech in different languages, etc.). One or more systems described herein may then perform one or more workflows based on the scored quality of isolated audio stream 162 as a dub.

Figure 2:
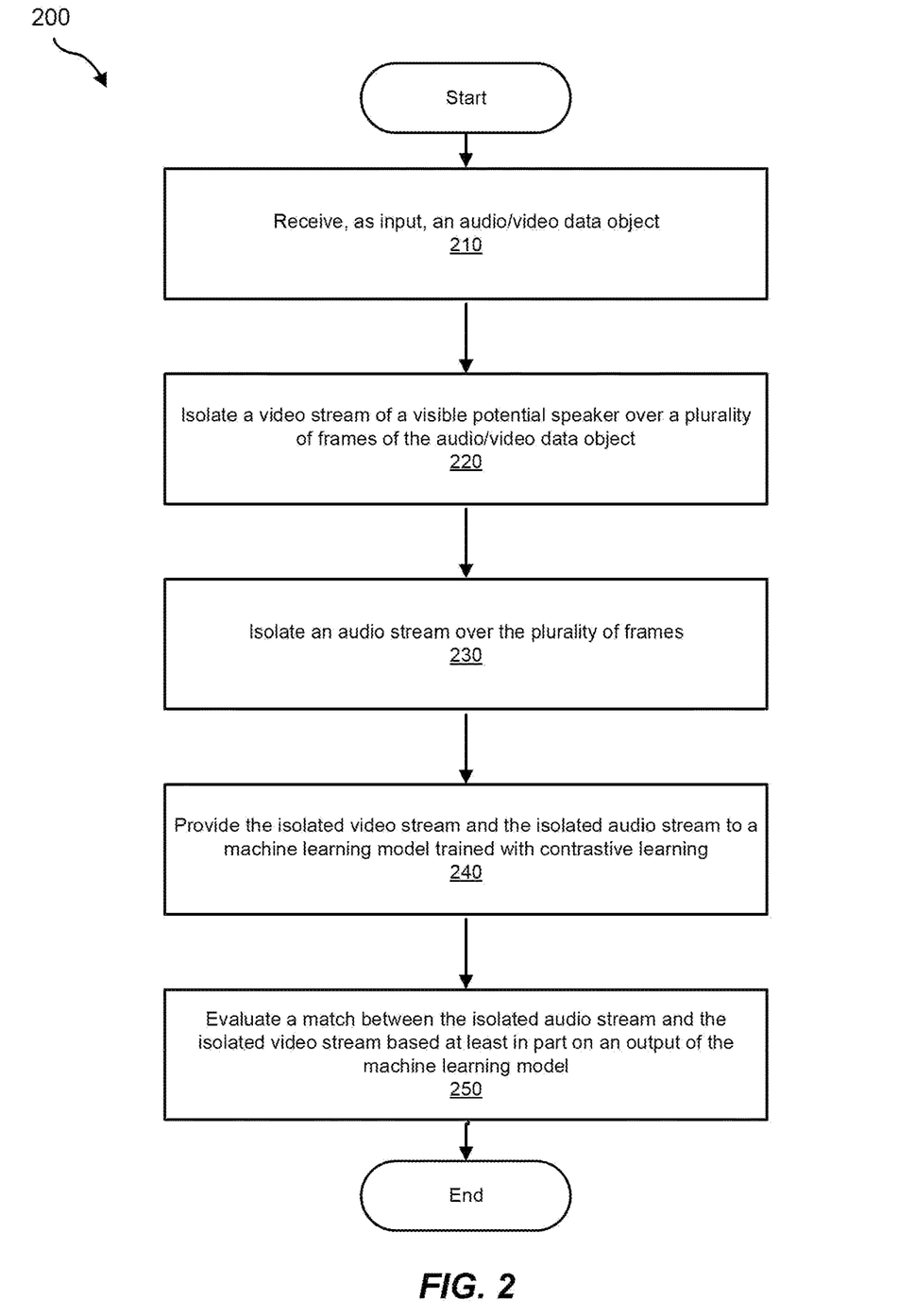
FIG. 2 is a flow diagram of an example method for active speaker detection.

FIG. 2 is a flow diagram of an exemplary computer-implemented method 200 for active speaker detection. The steps shown in FIG. 2 may be performed by any suitable computer-executable code and/or computing system, including computer system 100 illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210 one or more of the systems described herein may receive, as input, an audio/video data object. These systems may receive the audio/video data object in any of a variety of contexts.

In one example, the systems described herein may receive a video with multiple scenes and/or shots. In this case, in some examples, the systems described herein may preprocess the video to separate the video into one or more shots. For example, these systems may use one or more metrics to determine the location of shot boundaries. In one example, these systems may analyze frames of the video in sequence for changes between frames that indicate a change in shot. Examples of changes that may indicate a change of shot include, without limitation, a change in the average brightness of the frame (e.g., that exceeds a threshold), a change in perspective and/or camera angle, a change in environment, and a change in features (e.g., objects) found in the shot. In some examples, these systems may use metadata that describes changes in shots and/or changes in scenes to determine one or more shot boundaries.

Having determined shot boundaries, the systems described herein may divide the audio/video data object into one or more shots. Alternatively, in some examples, the systems described herein may simply receive the audio/video data object as an isolated shot. In some examples, the systems described herein may further divide a shot into separate segments. For example, these systems may determine that there are potentially multiple active speakers in a single shot and may divide the shot into smaller video segments. In some examples, these systems may determine that there are potentially multiple active speakers in the shot based on the video including multiple audio tracks with speech during the shot. Additionally or alternatively, these systems may perform a voice detection and/or isolation process to a single mixed audio track to determine that there are multiple speakers during the shot. In alternative to the foregoing, the systems described herein may receive the audio/video data object as a video segment that is shorter than the shot from which it was extracted.

Returning to FIG. 2, at step 220 one or more of the systems described herein may isolate a video stream of a visible potential speaker over a plurality of frames of the audio/video data object.

As discussed earlier, the systems described herein may isolate the video stream of the visible potential speaker in any of a variety of ways. In some examples, these systems may identify one or more faces in the audio/video data object. For example, these systems may perform a face detection process to each frame in the audio/video data object. In one example, the face detection process may include a single shot scale-invariant face detection process. Additionally or alternatively, the face detection process may be capable of detecting small faces and/or turned faces.

Once images of faces have been detected across the frames of the audio/video data object, the systems described herein may track one or more faces across the frames. Thus, for example, detected faces may be determined to be images of the same face across frames based on their positions in consecutive frames. In one example, these systems may perform an intersection-over-union calculation (e.g., by calculating the area of the intersection of two faces in consecutive frames and calculating the area of the union of the two faces, then dividing the area of the intersection by the area of the union). The systems described herein may determine that two consecutive face images are the same face based on a sufficiently high intersection-over-union proportion (e.g., 51% or higher, 70% or higher, 90% or higher, etc.). By continuing to pair face images across the frames, these systems may determine the location of a face across the audio/video data object.

After detecting and tracking faces across the audio/video data object (e.g., isolating faces in the sense of indexing the locations of each face across frames), the systems described herein may further isolate a video stream for one or more tracked faces. Thus, for example, these systems may extract and/or generate a cropped video stream of a face. Additionally or alternatively, these systems may remove background elements from the video stream and/or otherwise normalize the video stream to isolate the face and features of the face that indicate speech from other features.

Returning to FIG. 2, at step 230 one or more of the systems described herein may isolate an audio stream over the plurality of frames of the audio/video data object (e.g., over the same frames as the isolated video stream).

The systems described herein may isolate the audio stream in any suitable manner. For example, these systems may trim the audio stream from a larger audio stream so as to match the start and end times of the isolated video stream of the visible potential speaker (e.g., one of the tracked and isolated faces discussed with respect to step 220). In some examples, the audio/video data object may include multiple audio tracks. In these examples, the systems described herein may select an audio track that is designated (e.g., by metadata) as including speech. In some examples, the systems described herein may analyze each audio track for speech and designate the audio tracks containing speech accordingly. In some examples, a single audio track may include multiple voices, and the systems described herein may extract and isolate the voices into separate audio streams. In some examples, user input may designate which audio stream to use. In other examples, systems described herein may iterate the process described herein using different available audio tracks.

Returning to FIG. 2, at step 240 one or more of the systems described herein may provide the isolated video stream and the isolated audio stream to a machine learning model trained with contrastive learning. As explained above, the machine learning model may be trained with contrastive learning using a corpus of video segments of visible speakers with corresponding original audio for positive samples and a corpus of video segments of visible speakers with corresponding dubbed audio for negative samples.

The systems described herein may provide the isolated video stream and the isolated audio stream to the machine learning model in any format. In some examples, these systems may extract one or more features from the isolated audio stream and the isolated video stream, and provide the isolated video stream and the isolated audio stream to the machine learning model by providing the extracted features to the machine learning model.

The systems described herein may extract features from the isolated audio stream and/or from the isolated video stream in any suitable manner. In some examples, these systems may extract features using a neural network architecture (in one example, using an early fusion approach). For example, these systems may transform the isolated audio stream into a set of spectrogram data. These systems may then provide the spectrogram data to a convolutional neural network that identifies one or more audio features as a result.

Systems described herein may transform the isolated audio stream into a set of spectrogram data in any suitable manner. For example, these systems may transform the isolated audio stream into a set of spectrogram patches. As used herein, the term "spectrogram" as it relates to audio data may refer to any representation of an audio signal over time (e.g., by frequency and/or strength). The term "spectrogram patch," as used here, may refer to any spectrogram data discretized by time and by frequency. For example, systems described herein may transform spectrogram data to an array of discrete spectral bins, where each spectral bin corresponds to a time window and a frequency range and represents a signal strength within that time window and frequency range.

The systems described herein may generate the spectrogram patches in any suitable manner. For example, for each frame, these systems may decompose the frame with a short-time Fourier transform. In one example, these systems may apply the short-time Fourier transform using a series of time windows (e.g., each window being the length of time covered by a spectral bin). In some examples, these time windows may be overlapping.

As described above, the systems described herein may divide the spectral information into spectral/time bins both by time and by frequency. These systems may divide the spectral information into any suitable frequency bands. For example, these systems may divide the spectral information into mel-spaced frequency bands (e.g., frequency bands of equal size when using a mel scale rather than a linear scale of hertz). As used herein, the term "mel scale" may refer to any scale that is logarithmic with respect to hertz. Accordingly, "mel-spaced" may refer to equal divisions according to a mel scale. Thus, these systems may produce "mel spectrogram patches" (i.e., spectrogram patches with mel-spaced frequency bands). In some examples, the systems and methods described herein may log-scale the value (e.g., signal strength) of each bin (e.g., apply a logarithmic function to the magnitude value), thereby producing log-scaled mel spectrogram patches.

As noted above, systems described herein may also extract one or more features from the isolated video stream (e.g., using a neural network architecture). For example, these systems may transform the isolated video stream into a set of RGB frames. These systems may then provide the RGB frames to a convolutional neural network that identifies one or more video features as a result.

As mentioned earlier, the machine learning model may be trained with contrastive learning using original video/original audio pairs as positive samples and original video/dubbed audio pairs as negative samples. In one example, the training may involve a multi-way matching method, using N+M candidates (N positive pairs and M negative pairs). The model may be trained to minimize the distance between positive embeddings and maximize the distance between negative embeddings simultaneously, using a multi-way matching (MWM) loss. In one example, the training criterion may be as shown in Equations (1) and (2):

$$L_{MWM} = -\frac{1}{2N} \sum_{n=1}^{N} \sum_{m=1}^{M} y_{n,m} \log\log p_{(n,m)} \quad (1)$$

$$p_{(n,m)} = \frac{\exp(d_{n,m}^{-1})}{\sum_{k=1}^{M} \exp(d_{n,k}^{-1})} \quad (2)$$

In some examples, as will be explained in greater detail below, systems described herein may use the machine learning model trained with contrastive learning to extract one or more features from the isolated video stream and/or the isolated audio stream. These systems may then provide the extracted audio features and extracted video features to a back-end classifier to predict explicit labels.

As discussed above, systems described herein may use a machine learning model trained using contrastive learning. In some examples, one or more of the systems described herein may train the machine learning model. For example, these systems may use one or more of the approaches described above to train the machine learning model using a corpus of original video/original audio pairs for positive samples and original video/dubbed audio pairs for negative samples. In some examples, the systems described herein may preprocess one or more audio/video data objects (e.g., a library of films, serial shows, etc., with original and dubbed audio tracks) to produce the training corpus. In some examples, these systems may perform preprocessing using one or more of the approaches described above in relation to receiving an audio/video data object including, e.g., isolating a shot from a larger video segment. In addition, in some examples, these systems may perform one or more of the video (e.g., face) stream isolation steps and/or one or more of the audio stream isolation steps described above to preprocess the training data. Furthermore, these systems may perform one or more of the feature extraction steps described above to preprocess the training data.

Returning to FIG. 2, at step 250 one or more of the systems described herein may evaluate a match between the isolated audio stream and the isolated video stream based at least in part on an output of the machine learning model.

As may be appreciated from the above description of the machine learning model, in various examples the systems described herein may generate, via the machine learning model, a score, a probability, and/or a label indicating whether and/or how closely the isolated audio stream and the isolated video stream match. In some examples, a score may apply to, e.g., the isolated video stream and isolated audio stream pair as a whole. In some examples, a separate score may apply to, e.g., each frame (or other subdivision) of the isolated video stream and isolated audio stream.

Systems described herein may evaluate the match between the isolated audio stream and the isolated video stream in any suitable context. In some examples, these systems may also provide other isolated video streams from the same shot (e.g., containing other faces of potential speakers) paired with the isolated audio stream to the machine learning model. These systems may then compare the scores resulting from the pairing of each potential active speaker with the isolated audio stream and determine, based on the highest score, which potential active speaker in the shot is the speaker corresponding to the isolated audio stream.

After identifying an active speaker, in some examples systems described herein may generate metadata identifying the active speaker within the audio/video data object. For example, these systems may generate a beginning and ending timestamp for dialogue spoken by the active speaker (in some examples, in association with information distinguishing the active speaker from other potential active speakers, such as the location of the active speaker within one or more frames, an image of the active speaker, etc.). In some examples, these systems may also generate a workflow to, e.g., perform a dubbing task related to the active speaker.

In some examples, systems described herein may use the active speaker determination to analyze the audio/video data object. For example, these systems may determine how much time the active speaker speaks in the audio/video data object. Additionally or alternatively, these systems may compare activity by the active speaker in the audio/video data object with user engagement with the audio/video data object. For example, if the audio/video data object is a streaming video, systems described herein may correlate user engagement with the streaming video with the activity of the active speaker, to determine whether or not users tend to keep watching the streaming video when the active speaker is active and/or whether streaming videos in which the active speaker is more active tend to be more popular.

In some examples, the active speaker detection processes described herein may also be applied to estimate the quality of dubbed audio. For example, systems described herein may provide video of a speaker along with dubbed audio to the machine learning model. A high score from the machine learning model may indicate that the dubbed audio appears to match the video of the speaker, whereas a lower score may indicate that the dubbed audio does not appear to match the video of the speaker very well. Thus, these systems may detect mistimings in dubbing and/or mismatches between visemes of the speaker and phonemes of the dubbed audio.

In some examples, systems described herein may correlate dubbed audio quality scores as generated using the approaches described above with entities that create dubbed audio and/or processes used to create dubbed audio in order to evaluate the effectiveness of the entities and/or processes involved. Additionally or alternatively, these systems may generate one or more workflows in response to estimates of dubbed audio quality. For example, these systems may generate a workflow to revise the dubbing in response to a poor dubbing quality score (e.g., generating, storing, and/or transmitting a digitally represented task and/or notification to revise the dubbing).

In some examples, systems described herein may compare alternative dubbing takes to determine which dubbing take produces the highest score. In some examples, these systems may then automatically select the dubbing with the highest score and/or generate a notification indicating which dubbing has the highest score. In some examples, systems described herein may provide feedback on dubbing in real-time to one or more people performing and/or overseeing a dubbing process to aid in evaluating which dubbing attempts should be repeated. In some examples, systems described herein may suggest changes to the timing of dubbed audio as situated in an audio/video data object. For example, these systems may provide the dubbed audio along with video of the active speaker as input to the machine learning model multiple times, each time with the timing of the dubbed audio shifted, and determine, based on comparing the scores of the various shifted timings, which timing is the best match. In some examples, these systems may automatically adjust the timing of the dubbed audio within the audio/video data object to reflect the based match as estimated by the machine learning model.

Figure 3:
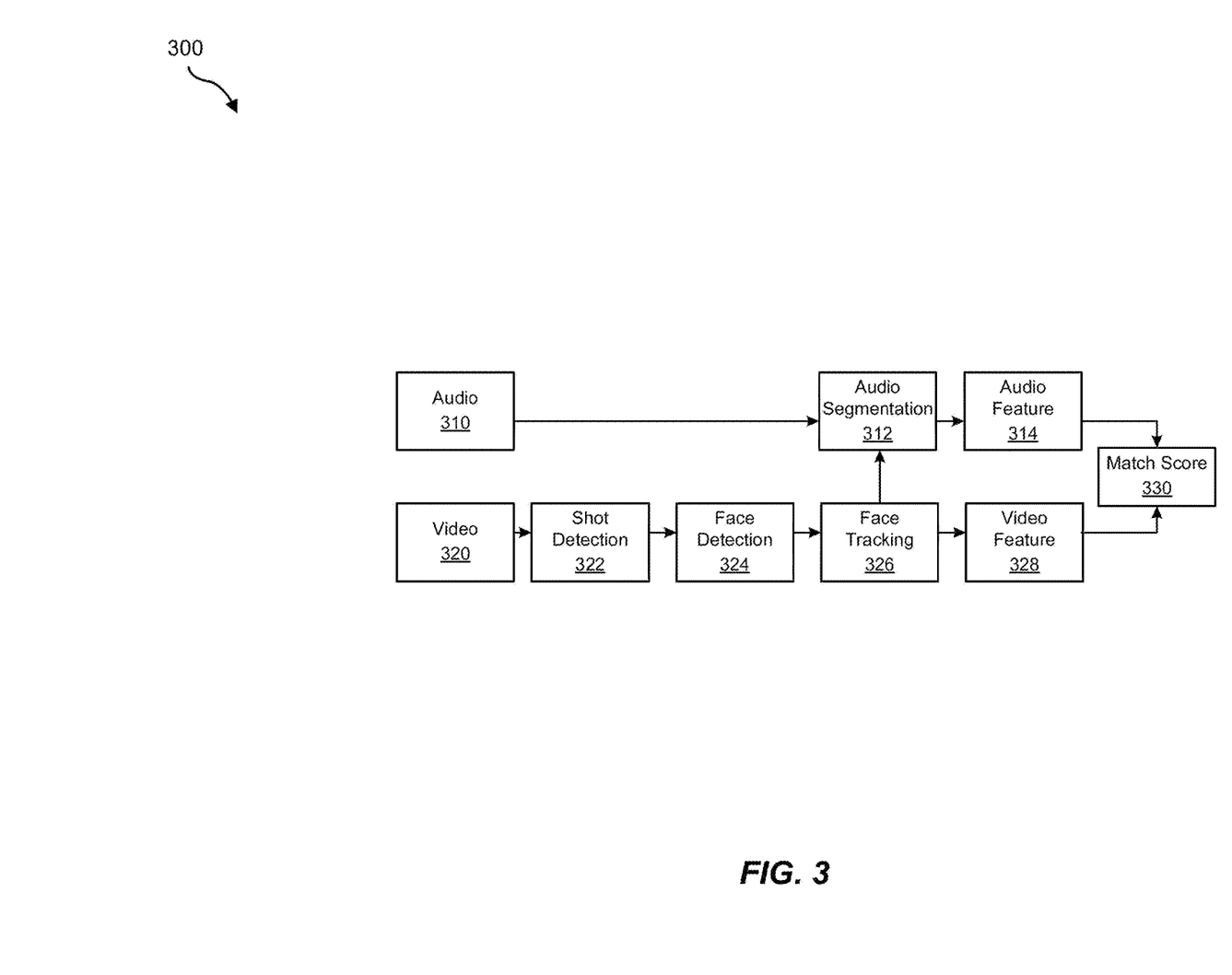
FIG. 3 is a block diagram of an example system for active speaker detection.

FIG. 3 is a block diagram of an example system 300 for active speaker detection. As shown in FIG. 3, system 300 may include an audio/video object with audio 310 and video 320. System 300 may perform a shot detection 322 on video 320 to identify shot boundaries and isolate a shot within video 320. System 300 may then perform a face detection 324 on each frame of the shot. System 300 may then perform face tracking 326 to identify the same face across frames of the shot. System 300 may use the results of face tracking 326 to determine an audio segmentation 312 of audio 310. System 300 may generate an audio feature 314 from the segmented audio and a video feature 328 from the face tracking 326. Audio feature 314 and video feature 328 may be provided to a matching system (e.g., a machine learning model) to produce a match score 330.

Figure 4:
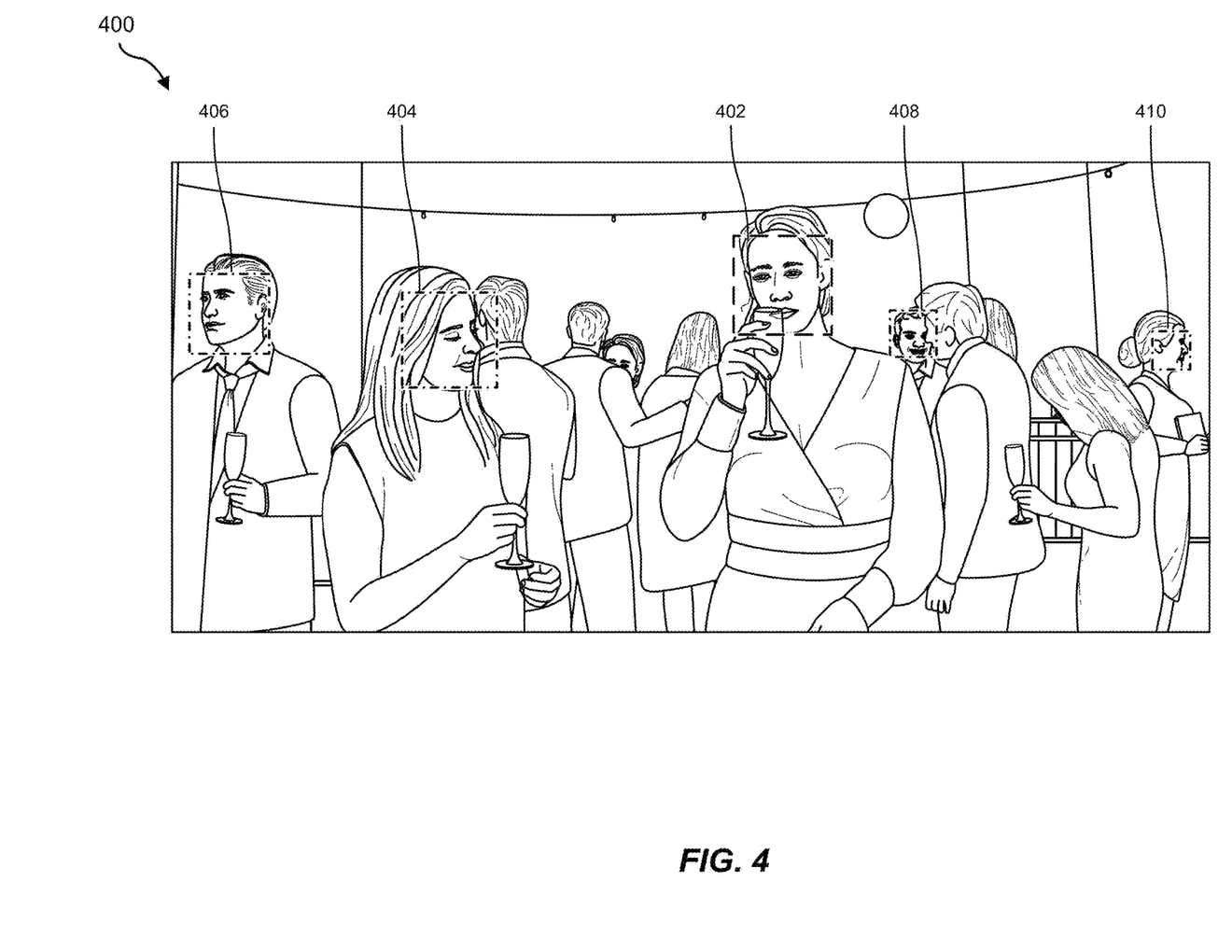
FIG. 4 is an illustration of an example face isolation process.

FIG. 4 is an illustration of an example face isolation process performed on a frame 400. As shown in FIG. 4, a face detection system may detect faces 402, 404, 406, and 408 in frame 400 (e.g., as potential active speakers). The face detection system may perform the same process on frames adjacent to frame 400. A face tracking system may determine which faces in one frame match which faces in the subsequent frame, and isolate a visual stream of each potential active speaker in a video segment (e.g., a shot) as a result.

Figure 5:
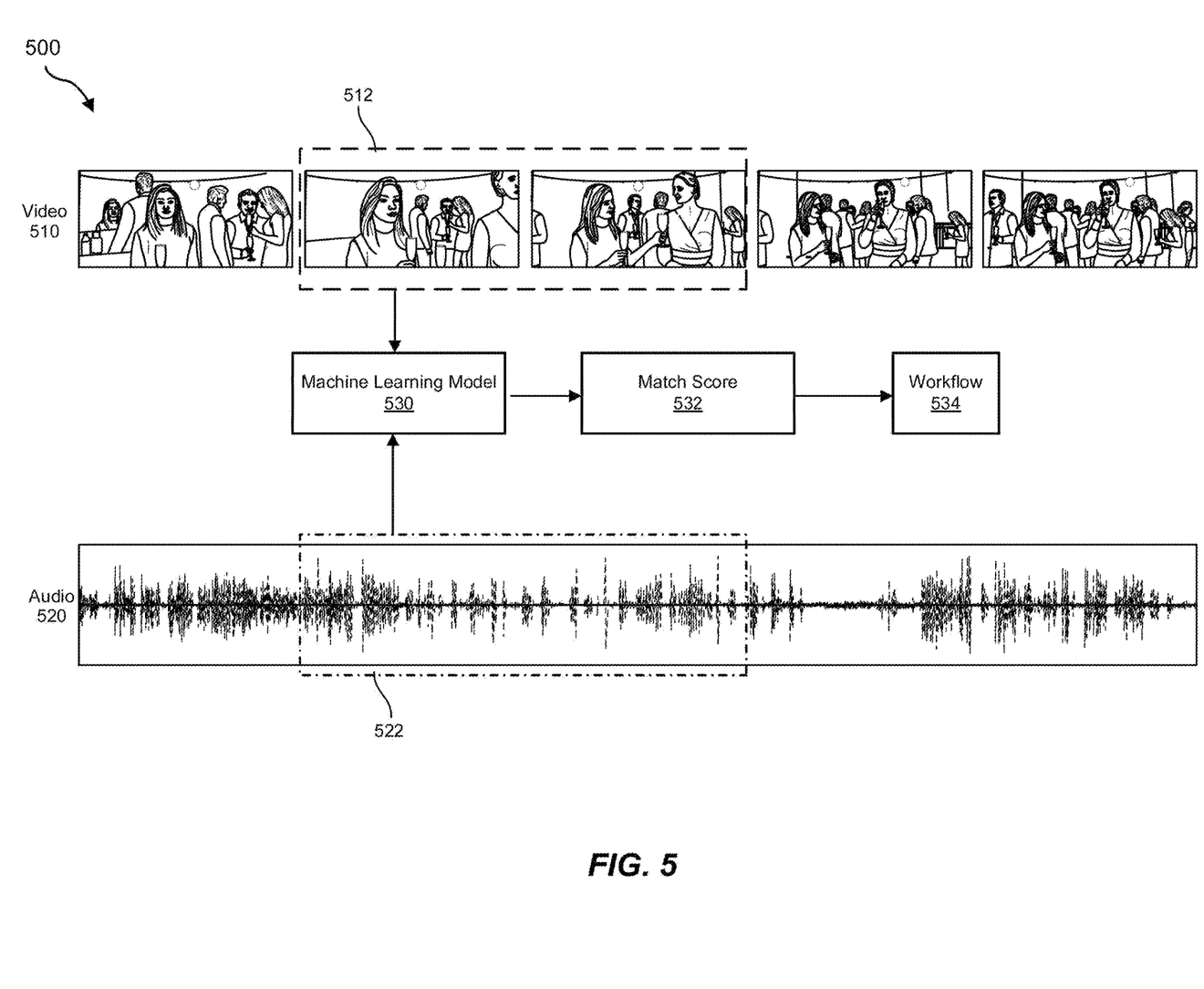
FIG. 5 is a diagram of an example active speaker match evaluation process.

FIG. 5 is a diagram of an example active speaker match evaluation process 500. As shown in FIG. 5, process 500 may isolate a video segment 512 from a video 510 (e.g., based on a shot detection process and/or a face tracking process). Process 500 may also isolate an audio segment 522 from audio 520 (e.g., to match video segment 512). Video segment 512 (or a portion of video segment 512, such as an isolated tracked face) and audio segment 512 may be provided (in some examples, after preprocessing, normalization, and/or feature extraction) to a machine learning model 530. Machine learning model 530 may generate a match score 532, indicating how closely audio segment 522 matches the apparent speech (e.g., isolated visual features of the face of a potential active speaker) in video segment 512. Based on match score 532, one or more systems described herein may execute a workflow 534.

Figure 6:
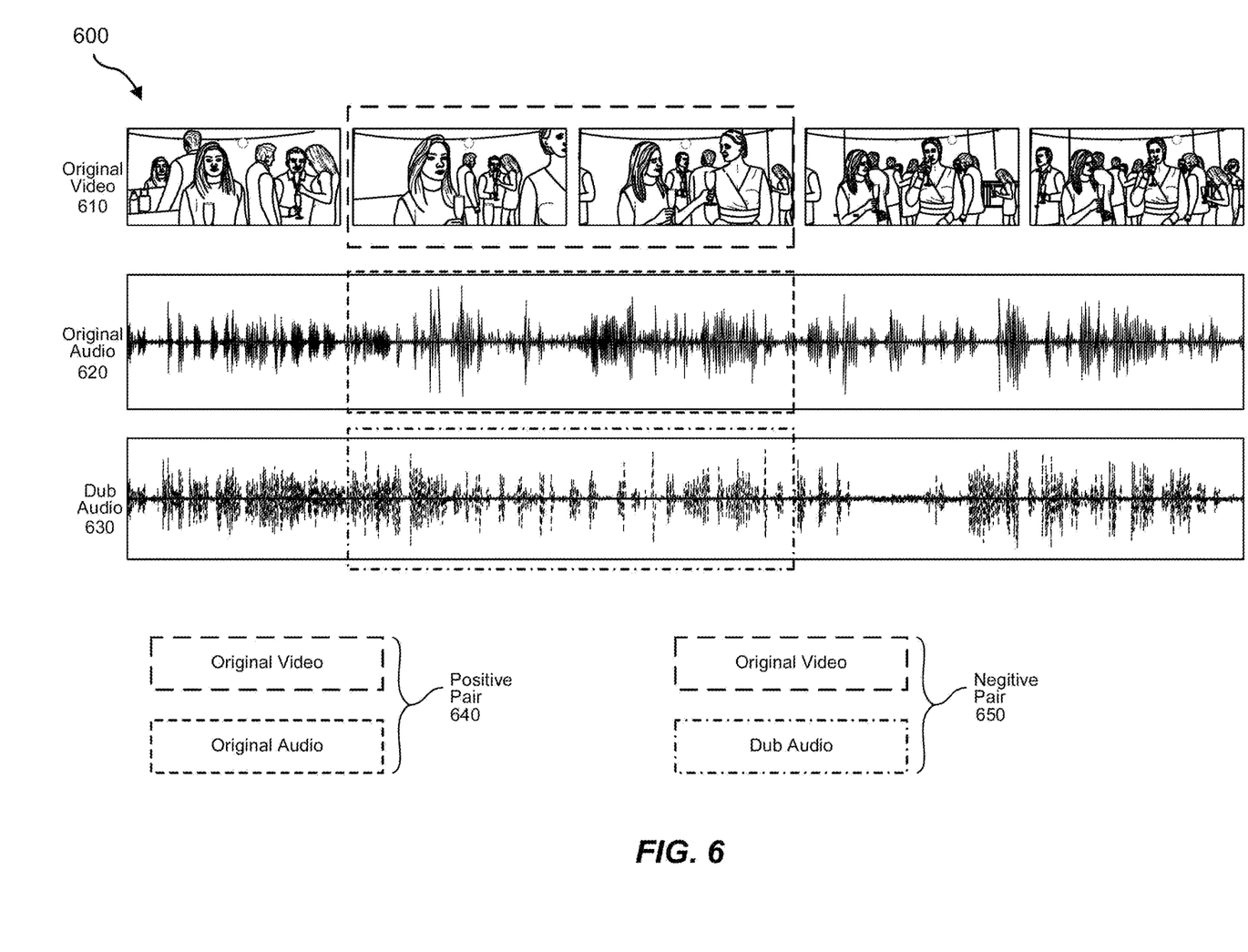
FIG. 6 is a diagram of an example machine learning model training input for active speaker detection.

FIG. 6 is a diagram of an example machine learning model training input 600 for active speaker detection. As shown in FIG. 6, input for training a machine learning model may be produced based on an original video 610, original audio 620, and dub audio 630. A segment of original video 610 may be isolated, as may corresponding segments of original audio 620 and dub audio 630. The segments for original video 610 and original audio 620 may form a positive pair 640, while the segments for original video 610 and dub audio 630 may form a negative pair 650 for contrastive learning.

Figure 7:
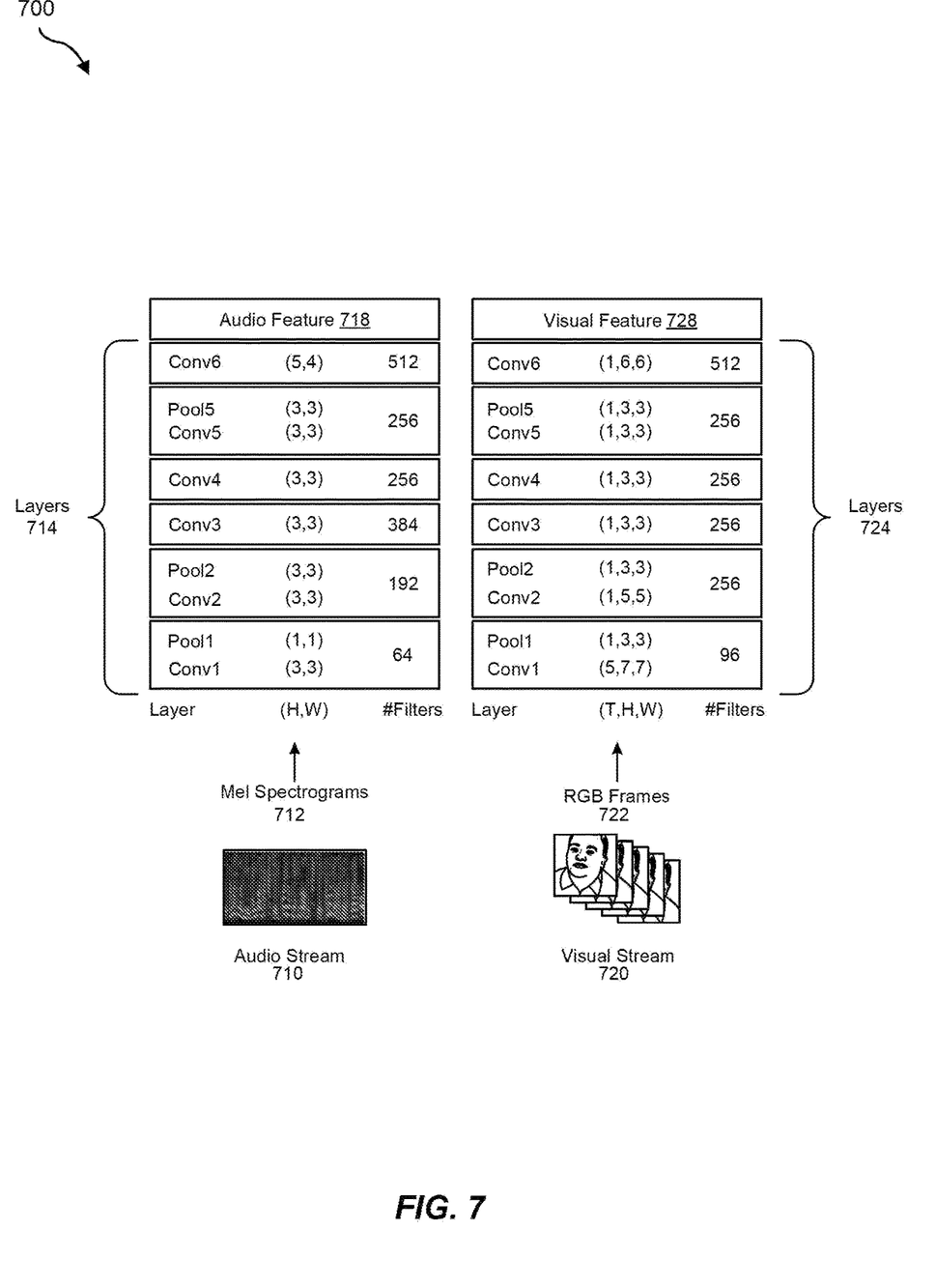
FIG. 7 is a diagram of an example feature extraction process for active speaker detection.

FIG. 7 is a diagram of an example feature extraction process 700 for active speaker detection. As shown in FIG. 7, convolutional neural networks may extract features from an audio stream 710 and a visual stream 720. Systems described herein may produce mel spectrograms 712 from audio stream 710. Mel spectrograms 712 may then be processed by one or more layers 714, including, e.g., one or more convolutional layers and one or more pooling layers. This process may generate an audio feature 718 representing audio stream 710 (e.g., to be used by a machine learning classifier trained with contrastive learning).

Similarly, systems described herein may produce RGB frames 722 from visual stream 720. These systems may then provide RGB frames 722 for processing by layers 724, including, e.g., one or more convolutional layers and one or more pooling layers. The process may generate a visual feature 728 representing visual stream 720 (e.g., to be used by a machine learning classifier trained with contrastive learning).

Figure 8:
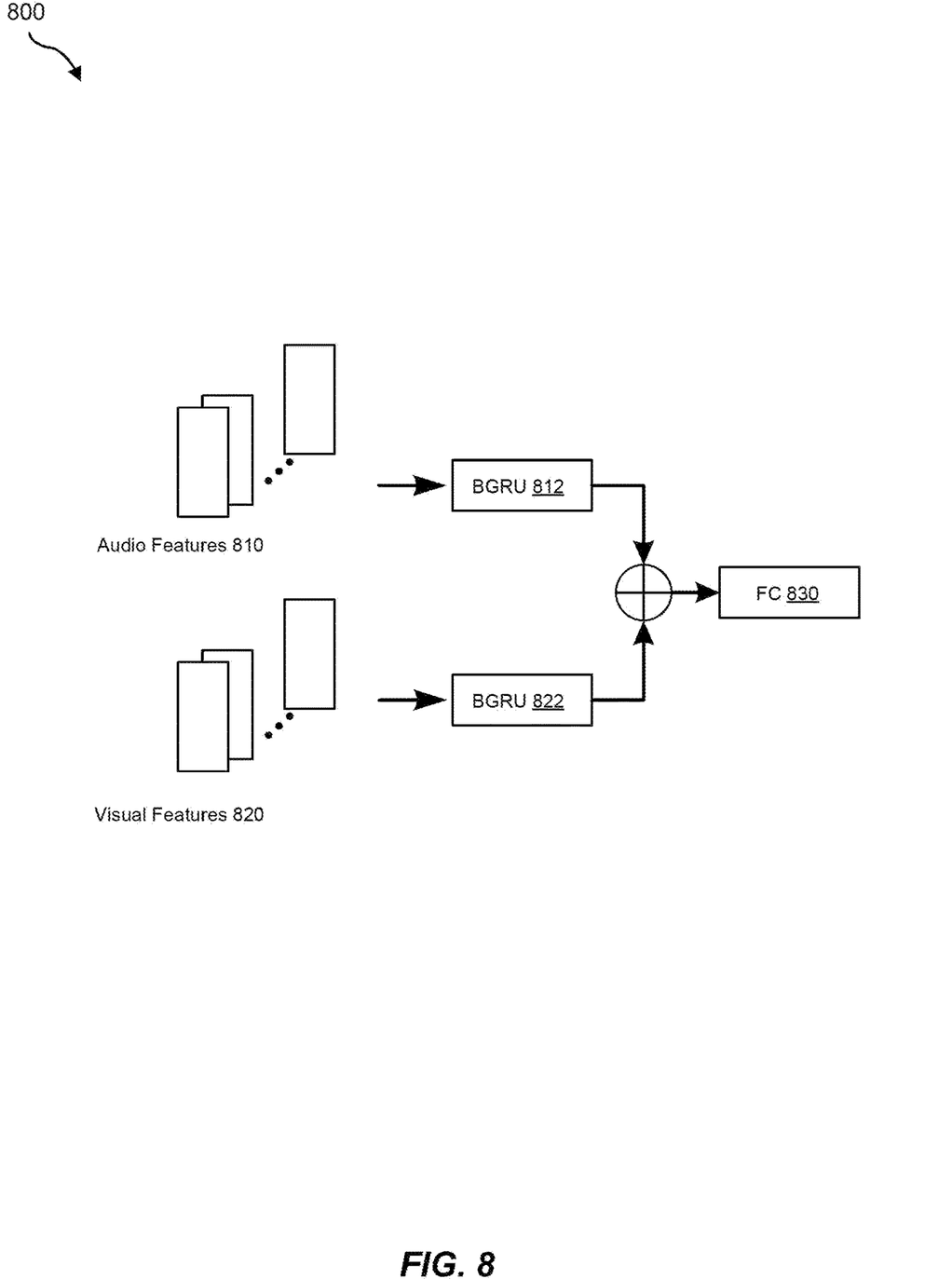
FIG. 8 is a block diagram of an example classifier for active speaker detection.

FIG. 8 is a block diagram of an example classifier 800 for active speaker detection. As shown in FIG. 8, classifier 800 may include a bi-directional gated recurrent unit (BGRU) 812 and a BGRU 822. Classifier 800 may also include two fully connected (FC) layers 830. Joint representation may be derived by concatenating the GRU outputs along the channel axis, which may then be projected into a two-node output layer for binary classification (e.g., active frames vs. non-active frames). In some examples, classifier 800 may serve as a back-end classifier for audio features 810 and visual features 820 extracted using a contrastive learning model.

Figure 9:
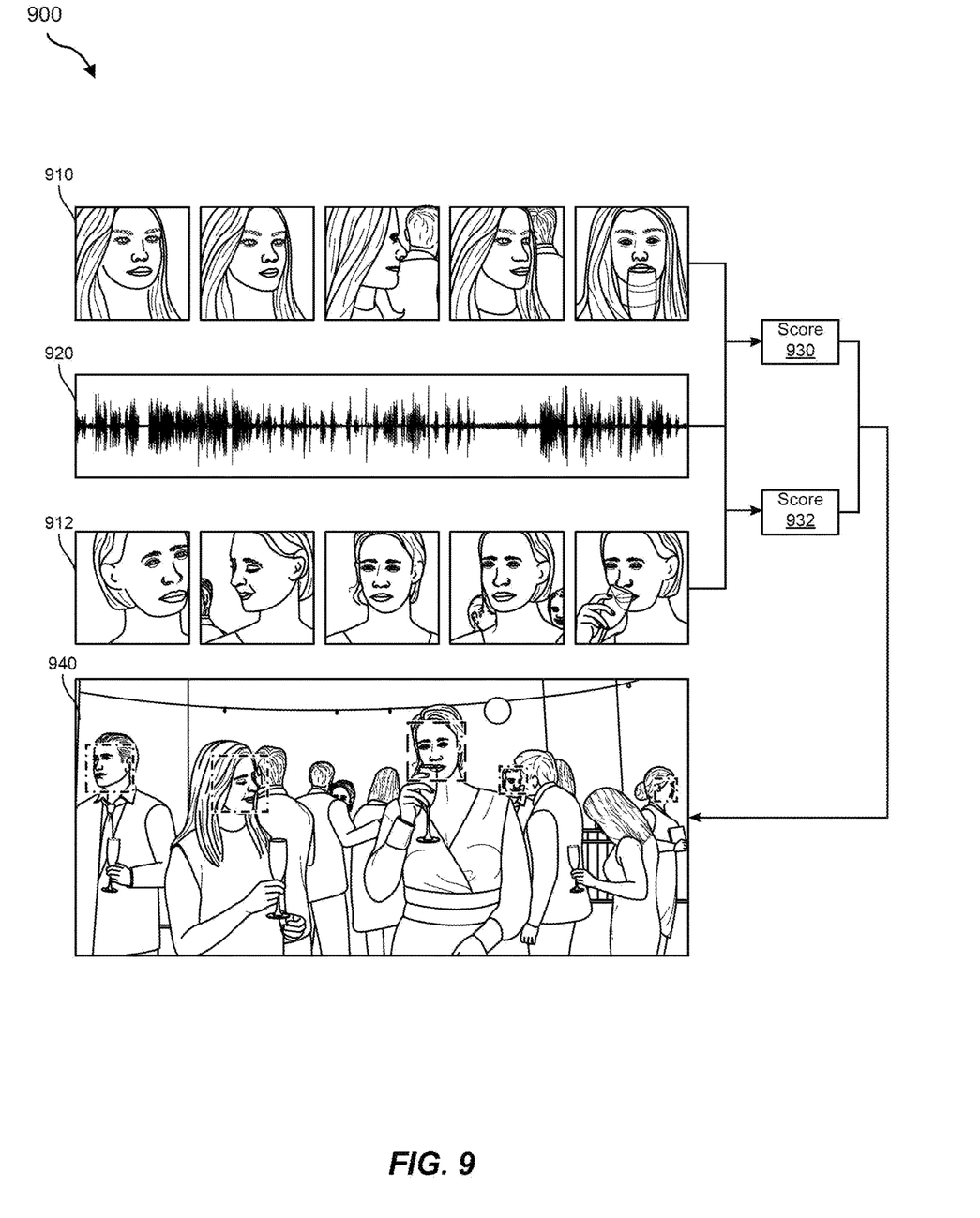
FIG. 9 is an illustration of an example evaluation and comparison process for active speaker detection.

FIG. 9 is an illustration of an example evaluation and comparison process 900 for active speaker detection. As shown in FIG. 9, an isolated face track 910 and an isolated face track 912 from a shot may each be paired with an audio track 920 from the shot. Systems described herein may generate a score 930 indicating how closely face track 910 matches audio track 920 and a score 932 indicating how closely face track 912 matches audio track 920. These systems may compare scores 930 and 932 to determine the active speaker in a shot 940.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an audio/video file to be transformed, transform the audio/video file, output a result of the transformation to detect an active speaker within the audio/video file, use the result of the transformation to evaluate dubbing for the audio/video file, and store the result of the transformation to create a task for a future workflow based on the detection of the active speaker and/or the evaluation of the dubbing. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving, as input, an audio/video data object;
isolating a video stream of a visible potential speaker over a plurality of frames of the audio/video data object;
isolating an audio stream over the plurality of frames;
providing the isolated video stream and the isolated audio stream to a machine learning model trained with contrastive learning, the contrastive learning using:
a corpus of video segments of visible speakers with corresponding original audio for positive samples; and
a corpus of video segments of visible speakers with corresponding dubbed audio for negative samples; and
evaluating a match between the isolated audio stream and the isolated video stream based at least in part on an output of the machine learning model.

2. The computer-implemented method of claim 1, wherein:
the isolated audio stream comprises dubbed audio of the visible potential speaker speaking; and
evaluating the match between the isolated audio stream and the isolated video stream comprises using the output of the machine learning model as a factor in a dubbing quality score of the dubbed audio of the visible potential speaker speaking.

3. The computer-implemented method of claim 2, further comprising executing a workflow relating to the audio/video data object based at least in part on the dubbing quality score.

4. The computer-implemented method of claim 3, wherein the workflow comprises a task to modify video within the audio/video data object to match the dubbed audio more closely.

5. The computer-implemented method of claim 3, wherein the workflow comprises a task to modify dubbed audio within the audio/video data object to match video within the audio/video data object more closely.

6. The computer-implemented method of claim 2, further comprising comparing the dubbed audio of the visible potential speaker speaking with an alternate dubbed audio of the visible potential speaker speaking based at least in part on the dubbing quality score.

7. The computer-implemented method of claim 1, further comprising:
isolating at least one additional video stream of at least one additional visible potential speaker over the plurality of frames of the audio/video data object;
providing the isolated at least one additional video stream and the isolated audio stream to the machine learning model; and
evaluating at least one additional match between the isolated audio stream and the isolated at least one additional video stream based at least in part on at least one additional output of the machine learning model.

8. The computer-implemented method of claim 7, further comprising comparing the match with the at least one additional match, based at least in part on the output and the at least one additional output of the machine learning model, to determine a closest matching video stream among the isolated video stream and the isolated at least one additional video stream.

9. The computer-implemented method of claim 8, further comprising generating metadata designating the closest matching video stream as showing an active speaker in the plurality of frames of the audio/video data object.

10. The computer-implemented method of claim 9, further comprising executing a workflow based at least in part on the metadata designating the closest matching video stream as showing an active speaker.

11. A system comprising:
at least one physical processor;
physical memory comprising computer-executable instructions that, when executed by the physical processor, cause the physical processor to:
receive, as input, an audio/video data object;
isolate a video stream of a visible potential speaker over a plurality of frames of the audio/video data object;
isolate an audio stream over the plurality of frames;
provide the isolated video stream and the isolated audio stream to a machine learning model trained with contrastive learning, the contrastive learning using:
a corpus of video segments of visible speakers with corresponding original audio for positive samples; and
a corpus of video segments of visible speakers with corresponding dubbed audio for negative samples; and
evaluate a match between the isolated audio stream and the isolated video stream based at least in part on an output of the machine learning model.

12. The system of claim 11, wherein:
the isolated audio stream comprises dubbed audio of the visible potential speaker speaking; and
evaluating the match between the isolated audio stream and the isolated video stream comprises using the output of the machine learning model as a factor in a dubbing quality score of the dubbed audio of the visible potential speaker speaking.

13. The system of claim 12, further comprising executing a workflow relating to the audio/video data object based at least in part on the dubbing quality score.

14. The system of claim 13, wherein the workflow comprises a task to modify video within the audio/video data object to match the dubbed audio more closely.

15. The system of claim 13, wherein the workflow comprises a task to modify dubbed audio within the audio/video data object to match video within the audio/video data object more closely.

16. The system of claim 12, further comprising comparing the dubbed audio of the visible potential speaker speaking with an alternate dubbed audio of the visible potential speaker speaking based at least in part on the dubbing quality score.

17. The system of claim 11, further comprising:
isolating at least one additional video stream of at least one additional visible potential speaker over the plurality of frames of the audio/video data object;
providing the isolated at least one additional video stream and the isolated audio stream to the machine learning model; and
evaluating at least one additional match between the isolated audio stream and the isolated at least one additional video stream based at least in part on at least one additional output of the machine learning model.

18. The system of claim 17, further comprising comparing the match with the at least one additional match, based at least in part on the output and the at least one additional output of the machine learning model, to determine a closest matching video stream among the isolated video stream and the isolated at least one additional video stream.

19. The system of claim 18, further comprising generating metadata designating the closest matching video stream as showing an active speaker in the plurality of frames of the audio/video data object.

20. A non-transitory computer-readable medium comprising one or more computer-executable instructions that, when executed by at least one processor of a computing device, cause the computing device to:
- receive, as input, an audio/video data object;
- isolate a video stream of a visible potential speaker over a plurality of frames of the audio/video data object;
- isolate an audio stream over the plurality of frames;
- provide the isolated video stream and the isolated audio stream to a machine learning model trained with contrastive learning, the contrastive learning using:
  - a corpus of video segments of visible speakers with corresponding original audio for positive samples; and
  - a corpus of video segments of visible speakers with corresponding dubbed audio for negative samples; and
- evaluate a match between the isolated audio stream and the isolated video stream based at least in part on an output of the machine learning model.

* * * * *